United States Patent [19]

Libutti et al.

[11] 3,932,588
[45] Jan. 13, 1976

[54] AMMONIUM CARBONATES AS COLD-END ADDITIVES TO A DESULFURIZATION PROCESS

[75] Inventors: Bruce L. Libutti, Bethayres; Richard J. Neddenriep, Doylestown, both of Pa.

[73] Assignee: Betz Laboratories, Inc., Trevose, Pa.

[22] Filed: Nov. 5, 1973

[21] Appl. No.: 413,122

[52] U.S. Cl. .............................................. 423/244
[51] Int. Cl.$^2$ ..................... B01J 8/00; C01B 17/00
[58] Field of Search .......................... 423/242–244, 423/5, 45

[56] References Cited
UNITED STATES PATENTS 3,505,008   4/1970   Frevel et al. ....................... 423/244

FOREIGN PATENTS OR APPLICATIONS 135,369   11/1949   Australia .............................. 423/244

*Primary Examiner*—Oscar R. Vertiz
*Assistant Examiner*—Gregory A. Heller
*Attorney, Agent, or Firm*—Alexander D. Ricci; Steven H. Markowitz

[57] ABSTRACT

The present invention is directed to a method of controlling the condensation of sulfur trioxide in flue gases to thereby inhibit the corrosion of metallic parts because of the sulfuric acid inherently formed. Basically, the method provides for the addition of particulate ammonium carbonates to the flue gas at a place where it is experiencing turbulence, and where its temperature is below 950° F. and preferably in the range of 250° F. to 450° F.

8 Claims, No Drawings

AMMONIUM CARBONATES AS COLD-END ADDITIVES TO A DESULFURIZATION PROCESS

BACKGROUND OF THE INVENTION

As is well-known to boiler operators, sulfur containing fuels, whether it be coal or oil, do present problems not only from a pollutional point of view, i.e., acid smut, but also cause problems with respect to the useful life of metallic equipment and parts which are in contact with the flue gases containing the sulfur biproducts of combustion.

Upon combustion, the sulfur in the fuel is converted to sulfur dioxide and sulfur trioxide. When sulfur trioxide reaches its dew temperature, it reacts with the moisture in the flue gas to produce the very corrosive sulfuric acid. The gases themselves are troublesome as air pollutants, while the acid formed is damaging from corrosion aspects.

As can be appreciated, the greater the sulfur content of the fuel, the more the effects are disastrous. This is particularly the case in industrial and utility operations where low grade oils are used for combustion purposes.

Although many additives have been utilized for the purpose of conditioning flue gases, few additives have found overall success. The reason for the relatively little success in this area of application is felt to be the peculiarities found in the different combustion systems and boiler designs. The gas dynamics and the loads produced, sometimes make chemical treatments for the most part impractical, therefore, requiring a combination of mechanical and chemical treatment.

It was to this problem that the present inventor addressed himself, i.e., the problem of reducing acid smut and acid corrosion of metal parts utilizing a minimum of mechanical and chemical treatment.

The basic area to which the present invention is directed is often referred to in the industry as the "cold-end" of a boiler operation. This area is generalized as being the path in the boiler system that the combustion gases follow after the gases have, in fact, performed their service of heating water, producing steam and/or superheating steam.

In the larger boiler systems, the last stages through which the hot combustion gases flow include the economizer, the air heater, the collection equipment or the electrostatic precipitator, and then the stack through which the gas is discharged.

GENERAL DESCRIPTION OF THE INVENTION

The present inventor discovered that if ammonium carbonates were added to the combustion gases in particulate or powder form at a stage where the gas was undergoing great turbulence in the cold-end, the particulate carbonates would, in fact, be carried along with the gas. However, it was determined that when the turbulence of the gas subsided, which occurs later in its path, the carbonate particles deposit on the surfaces of the metallic structures which comprise the equipment found in the cold-end.

It is believed that because the carbonates are alkaline and release ammonia, that which occurs is a reaction with the sulfur trioxide.

Because of the foregoing properties, an environment is produced which permits a reaction for the formation of the relatively harmless ammonium sulfate. Moreover, the dew point temperature for the sulfur trioxide is lowered substantially, thereby collectively yielding less deposition of sulfuric acid and correspondingly less corrosion of the metal parts. In addition, acid smut pollution would also be reduced.

In order to assure that effective results were attainable, it was ascertained that the carbonates should preferably be added or fed to the combustion gases up-stream of the air heater, and in a turbulent area. The carbonates may be fed utilizing a vibrating gravimetric feeder to assure that discrete particles of the ammonium compounds are fed. The size of the particle of the ammonium carbonates may be 360 microns with the preferred being 260 microns or less to insure the proper activity. The amount of the carbonates added is a function of the sulfur content of the fuel, and more specifically, the $SO_3$ (sulfur trioxide) produced upon combustion. Since a reaction is believed to occur, the fuel rates, are based upon mole ratios to assure accuracy. Basically, it has been found that feed rates based upon ammonia generation of 0.01 to 0.5 moles of ammonia per mole of sulfur trioxide generated has been found to be most satisfactory, or on a pound basis, a feed rate of 0.01 to 0.8 of ammonium carbonate per pound of $SO_3$ generated could be utilized.

In referring to ammonium carbonate compounds, it is specifically intended to include not only ammonium carbonate but also ammonium bicarbonate and compounds which might be precursors of these compounds and which lead to ammonia formation in the cold-end.

In order to assess the efficacy of the discovery, removable deposition probes were inserted in the cold-end area of a utility boiler system where they were contacted with the sulfur trioxide containing flue gases.

Using this method, the amount of sulfuric acid deposited on the probes at particular temperatures experienced within the cold-end could be determined, for example, by titration of the condensed acid with a standardized sodium hydroxide.

Three separate runs were conducted without the use of ammonium carbonate. These runs were then followed with four separate sets of runs wherein the ammonium carbonate was added. The ammonium carbonate utilized had a particle size of 160* microns. The results were as follows:

* Average micron size since particles measured from 105 to 180 microns.

TABLE 1

Tabulation of $H_2SO_4$ deposition vs. temperature / Blank runs (without treatment)

| Run 1 | | Run 2 | | Run 3 | |
|---|---|---|---|---|---|
| Temp. °F | Wt. $H_2SO_4$* | Temp. °F | Wt. $H_2SO_4$* | Temp. °F | Wt. $H_2SO_4$* |
| 401 | 0.90 | 370 | 0.40 | 420 | 0.41 |
| 391 | 0.85 | 366 | 0.29 | 416 | 0.30 |
| 390 | 0.58 | 352 | 0.45 | 416 | 0.43 |
| 373 | 0.81 | 345 | 0.65 | 405 | 0.43 |
| 352 | 1.35 | 334 | 0.63 | 399 | 0.30 |
| 350 | 1.35 | 316 | 0.85 | 400 | 0.41 |
| 323 | 2.33 | 302 | 0.99 | 387 | 0.27 |
| | | | | 377 | 0.41 |
| 321 | 2.15 | 289 | 1.80 | 361 | 0.44 |

TABLE 1-continued

Tabulation of H$_2$SO$_4$ deposition vs. temperature / Blank runs (without treatment)

| Run 1 | | Run 2 | | Run 3 | |
|---|---|---|---|---|---|
| Temp. °F | Wt. H$_2$SO$_4$* | Temp. °F | Wt. H$_2$SO$_4$* | Temp. °F | Wt. H$_2$SO$_4$* |
|  |  |  |  | 342 | 0.44 |
| 315 | 2.33 | 272 | 2.04 | 321 | 1.10 |
| 301 | 2.15 | 270 | 2.22 | 330 | 1.40 |
| 285 | 2.92 | 212 | 2.51 | 254 | 2.00 |

*g. H$_2$SO$_4$ deposited on equal areas, per minute of exposure, ×10$^4$

TABLE 2

Tabulation of H$_2$SO$_4$ deposition vs. temperature
39 lb/hr (feed rate of ammonium carbonate product**)

| Run 4 (started currently with feed) | | Run 5 (started 45 minutes after start of feed) | |
|---|---|---|---|
| Temp. °F | Wt. H$_2$SO$_4$* | Temp. °F | Wt. H$_2$SO$_4$* |
| 386 | 0.23 | 365 | 0.36 |
| 381 | 0.43 | 362 | 0.32 |
| 377 | 0.47 | 361 | 0.23 |
| 366 | 0.47 | 350 | 0.27 |
| 358 | 0.65 | 348 | 0.36 |
| 345 | 0.60 | 345 | 0.27 |
| 333 | 0.55 | 342 | 0.42 |
| 321 | 1.30 | 325 | 0.38 |
| 314 | 1.70 | 307 | 0.43 |
| 309 | 1.60 | 288 | 0.55 |
| 247 | 1.70 | 268 | 0.49 |
|  |  | 200 | 0.27 |

Run 6   27 lb/hr (feed rate of ammonium carbonate product**) started 45 minutes after feed started.
Run 7   13 lb/hr (feed rate of ammonium carbonate product**) started 45 minutes after feed started.

| Run 6 | | Run 7 | |
|---|---|---|---|
| Temp. °F | Wt. H$_2$SO$_4$* | Temp. °F | Wt. H$_2$SO$_4$* |
| 306 | 0.11 | 328 | 0.44 |
| 301 | 0.34 | 321 | 0.44 |
| 300 | 0.23 | 305 | 0.54 |
| 288 | 0.55 | 298 | 0.55 |
| 280 | 0.38 | 271 | 0.70 |
| 283 | 0.36 | 260 | 1.00 |
| 255 | 0.44 | 240 | 1.00 |
| 242 | 0.60 | 223 | 1.10 |
| 240 | 0.44 | 200 | 1.20 |
| 198 | 0.68 | 210 | 1.30 |
| 145 | 0.72 | 150 | 1.10 |

Feed Rate   4 lb/hr (runs made 45 minutes after feed started.)

| Run 8 | | Run 9 | |
|---|---|---|---|
| Temp. °F | Wt. H$_2$SO$_4$ | Temp. °F | Wt. H$_2$SO$_4$ |
| 357 | 0.54 | 285 | 0.63 |
|  |  | 282 | 0.68 |
| 352 | 0.42 | 257 | 0.68 |
| 348 | 0.34 | 261 | 0.79 |
| 333 | 0.47 | 257 | 0.79 |
| 315 | 0.42 | 234 | 0.90 |
| 275 | 0.49 | 225 | 0.90 |
| 290 | 0.60 | 210 | 0.79 |
| 253 | 0.70 | 193 | 0.68 |
|  |  | 181 | 0.79 |
| 245 | 0.90 | 170 | 0.70 |
| 195 | 0.90 | 140 | 0.92 |

*g. H$_2$SO$_4$ deposited on equal areas, per minute of exposure, × 10$^4$
** Product comprise 50% by weight ammonium bicarbonate (particle size: 160 microns) and 50% by weight silica (improves flow of product)

It was conclusively illustrated by the studies that the addition of ammonium carbonate to the flue gas successfully effected the amount of sulfuric acid deposited on the probes. Since corrosion rates are a direct function of the sulfuric acid deposited, it follows that corrosion had been inhibited to an acceptable degree.

Having thus described the invention, what is claimed is:

1. A method of reducing the amount of sulfur trioxide condensation on, and therefore the amount of sulfuric acid corrosion of, metal parts in contact with flue gases derived from the combustion of sulfur containing fuels which flue gases flow along a path at the cold-end of the combustion system from a first point of turbulence to a second point at which the turbulence subsides, said method comprising:
   a. adding to the flue gases at the cold-end of the combustion system and at the point of turbulence a particulate ammonium carbonate compound, and
   b. permitting the particulate carbonate compound to flow with the flue gases at least from the point of turbulence to the second point such that the particles deposit on the surfaces of the metal parts, wherein the carbonate compound is added to the flue gases in an amount from about 0.01 to 0.8 pound of the carbonate compound per pound of sulfur trioxide generated and wherein the carbonate compound has a particle size of 360 microns or less.

2. A method according to claim 1 wherein the ammonium carbonate compound has a particle size of 260 microns or less.

3. A method according to claim 2 wherein the temperature of the flue gas at the time of addition is from about 550° to 250° F.

4. A method according to claim 3 wherein the carbonate compound is ammonium carbonate.

5. A method according to claim 3 wherein the carbonate compound is ammonium bicarbonate.

6. A method according to claim 1 wherein the carbonate compound is added where the flue gases are below 950°F.

7. A method according to claim 6, wherein the ammonium carbonate compound has a particle size of 260 microns or less.

8. A method according to claim 6 wherein the temperature of the flue gas at the time of addition is from about 550° to 250° F.

* * * * *